S. JOHNSON.
Dumping-Car.

No. 215,129. Patented May 6, 1879.

WITNESSES:
Henry N. Miller
C. Sedgwick

INVENTOR:
S. Johnson
BY Munn & Co
ATTORNEYS.

UNITED STATES PATENT OFFICE.

STEPHEN JOHNSON, OF HUNTSVILLE, TEXAS.

IMPROVEMENT IN DUMPING-CARS.

Specification forming part of Letters Patent No. 215,129, dated May 6, 1879; application filed January 21, 1879.

*To all whom it may concern:*

Be it known that I, STEPHEN JOHNSON, of Huntsville, in the county of Walker and State of Texas, have invented a new and Improved Hand-Car for Freight, &c., of which the following is a specification.

The object of my invention is to furnish a hand-car adapted for running upon tracks and for dumping its load, and which may be used for loading wood or coal upon locomotive-tenders, for transferring freight from cars to vessels, and for other purposes of a similar nature.

My invention consists in a platform car or truck having two pairs of wheels, upon which it runs when on the track, and a third pair of wheels of narrow gage, and fitted midway of the length of the car. The car turns in dumping upon the axle of the center wheels, and the platform is fitted with tracks, so that a loaded car may be run upon one previously unloaded.

Figure 1:
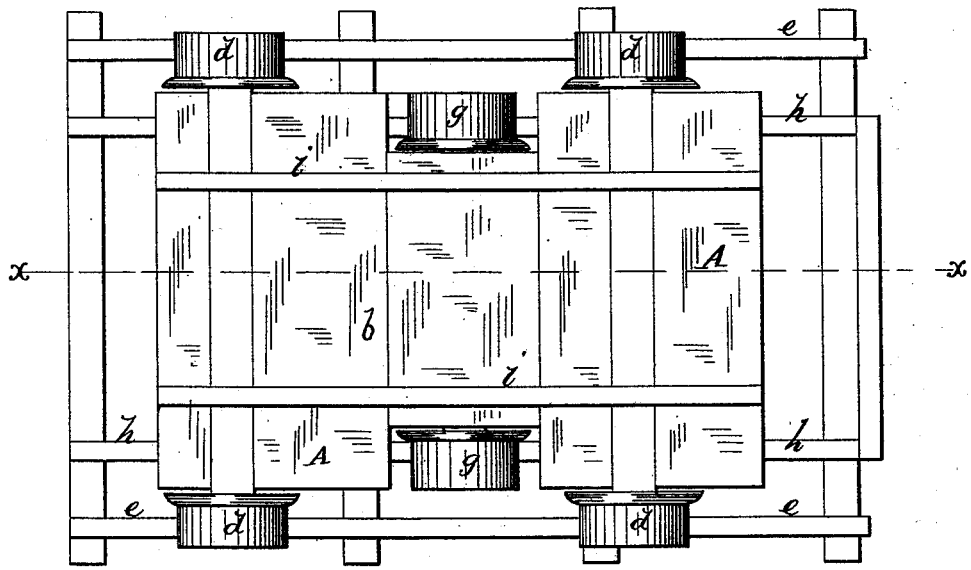
Figure 2:
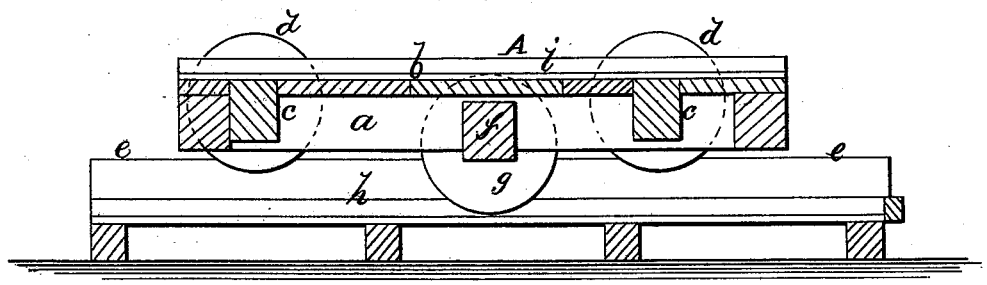

In the drawings, Figure 1 is a plan view of my improved car. Fig. 2 is a sectional elevation on line $x$ $x$.

Similar letters of reference indicate corresponding parts.

The car A consists of an oblong wooden frame, $a$, and platform $b$, mounted on axles $c$ $c$, that carry loosely the wheels $d$, which are adapted for running upon the railroad-rails $e$, which are the usual rails of a railroad. Beneath the center of frame $a$ is an axle, $f$, carrying wheels $g$. This axle $f$ is shorter than axles $c$, so that the wheels $g$ run upon the track $h$, of narrower gage than track $e$. Upon the upper side of platform $b$ are rails $i$, secured to the platform.

The car is to be used as next described.

For loading a locomotive-tender with wood or coal, the loaded truck A is to be run on rails $e$ to the level of the tender or above the same, the track being laid on an inclined plane, if required, until forward wheels $d$ clear the end of track $e$, when the weight will rest on wheels $g$. In this position the car may be tipped on axle $f$ and the load dumped into the tender.

If a number of cars are required to load the tender, the second one can be run upon the unloaded car preceding, the wheels taking rails $i$, and the second car will be secured to the under one by hooks, and then dumped in the same manner.

In using the car for carrying goods back and forth from cars to vessels, the track will be laid upon the wharf or on trestle-work, and the car dumped in the same manner.

Having thus described my invention, I claim as new and desire to secure by Letters Patent—

The combination, in a car, of the frame $a$, the railed platform $b$ $i$ on axles $c$ $c$, the loose wheels $d$, and the short axle $f$, carrying wheels $g$, as shown and described.

STEPHEN JOHNSON.

Witnesses:
   G. B. STEARNS,
   W. T. JERGINS.